United States Patent

Shibazaki et al.

[11] 4,124,688
[45] Nov. 7, 1978

[54] PROCESS FOR PREPARING CUBIC CRYSTALS OF CALCIUM CARBONATE

[75] Inventors: Hiroji Shibazaki, Takarazuka; Setsuji Edagawa, Nishinomiya; Hisashi Hasegawa, Nishinomiya; Satoshi Kondo, Nishinomiya, all of Japan

[73] Assignee: Shiraishi Kogyo Kaisha, Ltd., Amagasaki, Japan

[21] Appl. No.: 827,218

[22] Filed: Aug. 24, 1977

[30] Foreign Application Priority Data

Oct. 1, 1976 [JP] Japan ................................. 51-118810

[51] Int. Cl.² ............................................ C01F 11/18
[52] U.S. Cl. .................................................. 423/432
[58] Field of Search ............... 423/432, 430, 165, 158, 423/224, 230; 106/306

[56] References Cited

U.S. PATENT DOCUMENTS

| | | | |
|---|---|---|---|
| 1,188,505 | 6/1916 | Statham | 423/165 |
| 1,372,193 | 3/1921 | Roon | 423/432 |
| 2,538,802 | 1/1951 | Schur et al. | 423/432 |

FOREIGN PATENT DOCUMENTS 562,544  7/1944  United Kingdom ..................... 423/432

OTHER PUBLICATIONS

Glasson, Reactivity of Lime and Related Oxides, J. Appl. Chem. 10, Jan. 1960, p. 42-48.

Primary Examiner—O. R. Vertiz
Assistant Examiner—Thomas W. Roy
Attorney, Agent, or Firm—Bierman & Bierman

[57] ABSTRACT

Cubic calcium carbonate crystals of uniform size are prepared by contacting with $CO_2$ a starting aqueous suspension containing $Ca(OH)_2$ and cubic $CaCO_3$ crystals less than $0.1\mu m$ in size, adding $Ca(OH)_2$ to the suspension resulting from the first step and contacting the resultant mixture with $CO_2$.

15 Claims, 1 Drawing Figure

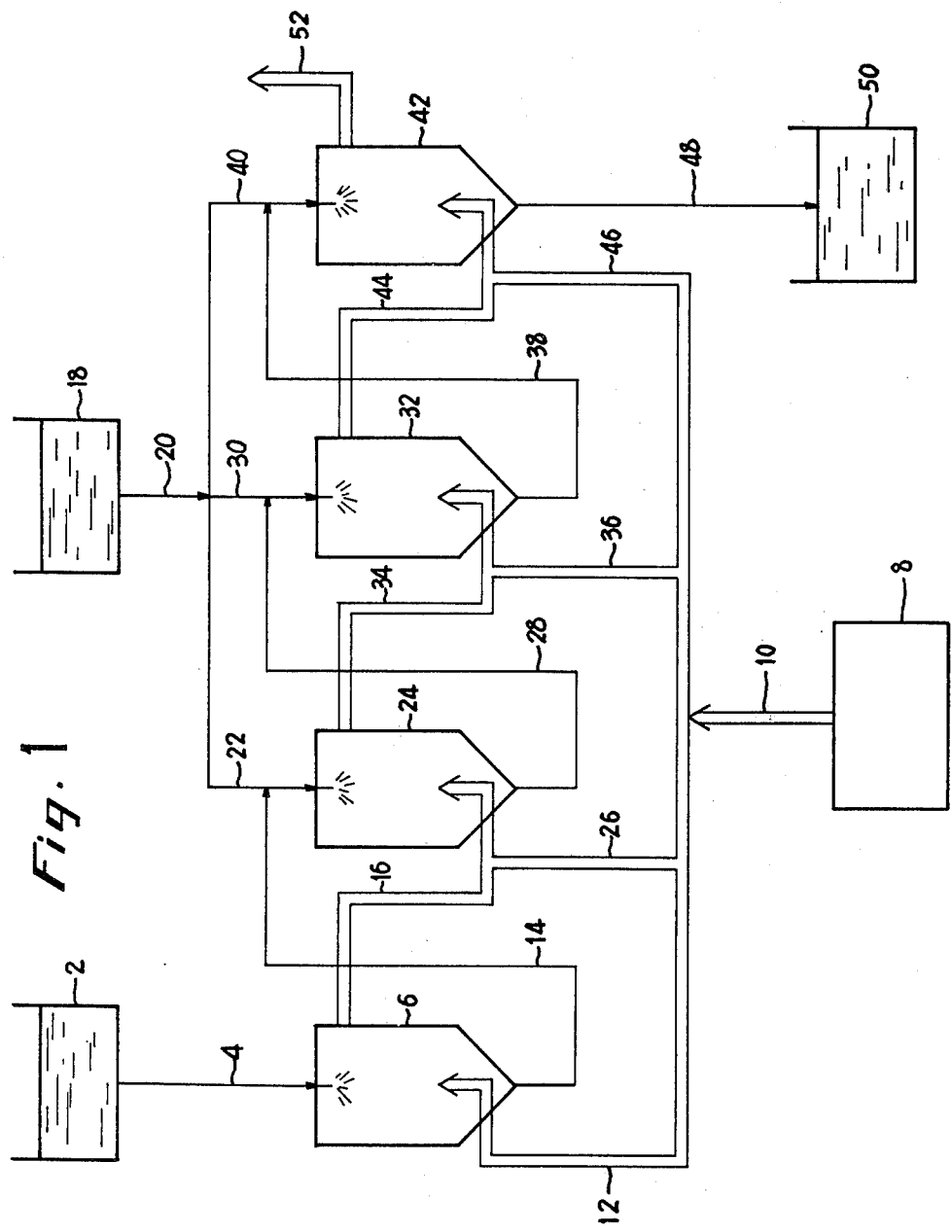

PROCESS FOR PREPARING CUBIC CRYSTALS OF CALCIUM CARBONATE

This invention relates to a process for preparing cubic crystals of calcium carbonate, and more particularly to a process well-suited to the preparation of cubic calcium carbonate crystals of uniform size in the range of about 0.1 to about 1.0 μm.

Throughout the specification and appended claims, the term "size" of cubic calcium carbonate crystals refers to the length of one edge of the cubic crystal.

It is well known to prepare precipitated calcium carbonate by reacting milk of lime with carbon dioxide by blowing the dioxide into the lime milk (carbonation process) or by reacting calcium chloride with water-soluble carbonate in a solution system. According to the carbonation process widely adopted for commercial operation at present, calcium carbonate can be manufactured in the form of fine cubic crystals less than about 0.1 μm in average size and of spindle-shaped or needlelike crystals larger than about 1.0 μm in average size, but it is difficult to produce cubic calcium carbonate crystals of intermediate sizes ranging from about 0.1 to about 1.0 μm. This is due to the fact that the reaction of the carbonation process takes place in a nonhomogeneous system which is commercially difficult to adjust to such reaction conditions that will give cubic calcium carbonate crystals of uniform size in the range of about 0.1 to about 1.0 μm. Even if it is attempted to obtain calcium carbonate crystals of average size in the range of about 0.1 to about 1.0 μm by the carbonation process, the resulting product is a mixture of cubic crystals and spindle-shaped crystals and have widely varying sizes. It it also attempted to obtain cubic calcium carbonate crystals in sizes of about 0.1 to about 1.0 μm by forcing carbon dioxide into an aqueous suspension of fine cubic calcium carbonate crystals less than 0.1 μm in size and calcium hydroxide admixed therewith to cause crystallization on the fine crystals as nuclei. With this process, however, crystallization on the fine calcium carbonate nuclei initially contained in the suspension does not always predominate during the reaction between the calcium hydroxide and carbon dioxide, but nucleation also occurs simultaneously, forming new fine crystals of calcium carbonate. The resulting crop of calcium carbonate is therefore a mixture of cubic crystals about 0.1 to about 1.0 μm in size, fine cubic crystals of less than 0.1 μm, spindle-shaped aggregates of such fine cubic crystals, etc. Thus, it is impossible to obtain crystals of uniform size.

Accordingly, the main object of this invention is to provide a novel process for preparing cubic crystals of calcium carbonate free of the drawbacks heretofore experienced.

Another object of this invention is to provide a process well-suited to the preparation of cubic calcium carbonate crystals of uniform size in the range of about 0.1 to about 1.0 μm.

Other objects and features of this invention will become apparent from the following description.

This invention provides a process for preparing cubic calcium carbonate crystals of uniform size comprising:
 (i) a first step of spraying a starting aqueous suspension containing calcium hydroxide and cubic calcium carbonate crystals less than 0.1 μm in average size into a carbon dioxide-containing gas in the form of droplets 0.2 to 2.0 mm in diameter, and
 (ii) a second step of adding calcium hydroxide to the aqueous suspension resulting from the first step and spraying the mixture into a carbon dioxide-containing gas in the form of droplets 0.2 to 2.0 mm in diameter.

Our research has matured to a process comprising a first step of spraying a starting aqueous suspension containing calcium hydroxide and fine cubic crystals of calcium carbonate less than 0.1 μm in size and serving as nuclei into a carbon dioxide-containing gas to thereby effectively conduct carbonation in which crystal growth predominates, and a second step of adding calcium hydroxide to the resulting suspension containing cubic grown crystals of calcium carbonate and spraying the mixture into a carbon dioxide-containing gas, the second step being practiced at least once. We have found that with this process, the fine cubic nuclei grow into cubic calcium carbonate crystals of very uniform increased size in the range of about 0.1 to about 1.0 μm without involving noticeable aggregation. This invention has been accomplished based on this novel finding.

While the process of this invention comprises essentially of the first and second steps in order to obtain cubic calcium carbonate crystals at least about 0.1 μm in size, we have also found that the crystal size of the product can be increased as desired by practicing the second step repeatedly at least twice. However, if the carbonation is allowed to proceed to such an extent that the average size of the product exceeds about 1.0 μm, crystals tend to aggregate to non-uniform sizes, so that this invention is most advantageous to the preparation of cubic calcium carbonate crystals about 0.1 to about 1.0 μm in size.

The present process will be described below in greater detail. First, a starting aqueous suspension is prepared from calcium hydroxide and cubic calcium carbonate crystals less than 0.1 μm in average size. The proportions of the two components of the suspension are variable with the size of the crystals eventually obtained, economy, the scale of the apparatus, etc. Usually about 1 to about 30 parts by weight of calcium hydroxide is used per 100 parts by weight of fine cubic calcium carbonate crystals. (The parts and percentages hereinafter used are all by weight unless otherwise specified). Crystal growth takes place favorably with an increase in the amount of calcium hydroxide, but with calcium hydroxide present in too great a ratio, the crystallization of calcium carbonate does not proceed predominantly owing to simultaneous nucleation, leading to the aggregation of fine crystals to varying sizes and thus failing to give cubic crystals of uniform size. The amount of calcium hydroxide is preferably about 10 to about 25 parts, more preferably about 15 to about 20 parts, per 100 parts of fine cubic crystals of calcium carbonate. The particle size of calcium hydroxide, although not particularly limited, is preferably 0.05 to 0.15 μm in view of its relationship with the size of the droplets of the spray. Useful as the cubic calcium carbonate crystals less than 0.1 μm in average size serving as nuclei or seeds are those prepared by any of the known processes such as the carbonation process. Spindle-shaped or needlelike crystals of calcium carbonate are not suitable to use as nuclei because of the difficulty encountered in giving a product in the form of cubic crystals. With an increase in the concentration of the solids in the suspension, namely of the calcium hydroxide and fine calcium carbonate crystals, the production efficiency generally improves, but too great a solids concentration tends to reduce the effect of spraying and carbonation rate and to yield crystals of non-uniform size. Thus the solids concentration is usually up to about 15%, preferably about 5 to about 10%. The starting aqueous suspension can be prepared by any known method, for example, by preparing an aqueous suspension of fine cubic calcium carbonate crystals and an aqueous suspension of calcium hydroxide and mixing the suspensions together by mechanical agitating means such as a pipeline mixer, high-speed agitator of the turbine type or the like. Alternatively, the desired suspension can be prepared directly by adding the two components to water and mechanically agitating the mixture. A difference in the method of the preparation of the suspension produces no influence on the size and properties of the crystals finally obtained. The aqueous suspension thus prepared has a pH of about 12.8 or higher.

To perform the first step of the present process, the starting aqueous suspension is sprayed in the form of droplets, 0.2 to 2.0 mm in diameter, into a carbon dioxide-containing gas and is thereby brought into contact with the gas for reaction. The droplets, if less than 0.2 mm in diameter, tend to flow out from the system as entrained in the gas, whereas if in excess of 2.0 mm in diameter, the droplets will not be satisfactorily subjected to carbonation. The concentration of carbon dioxide in the gas is usually at least 20%, although dependent on the solids concentration of the starting aqueous suspension, the size of the droplets, economy, etc. Purified exhaust gas ($CO_2$ concentration: about 30%) resulting from the calcination of limestone is advantageously usable for commercial purposes. The reaction between the starting aqueous suspension and the carbon dioxide-containing gas, which may be conducted at room temperature and atmospheric pressure, can be carried out with heating and/or with application of pressure to ensure promoted crystal growth. The temperature and pressure conditions should be determined from an overall viewpoint with consideration given to the equipment cost, ease of operation, reaction velocity, etc. When the reaction is conducted under elevated temperature and/or pressure, the temperature is usually up to about 70° C., preferably about 40° to about 60° C., and the pressure is usually up to about 2 kg/cm² G. The contact between the droplets of the suspension and the carbon dioxide-containing gas can be effected in a countercurrent or concurrent fashion or by mixing or any other desired method. Countercurrent contact, which is commercially most advantageous, can be effected for example by spraying the aqueous suspension into a reaction column from its top while causing the carbon dioxide-containing gas to flow upward from the bottom of the column at a superficial velocity in the column of about 0.1 to about 3 m/sec. Stated more specifically, it is preferable to spray an aqueous suspension having a solids concentration of 5 to 10% into the reaction column in the form of droplets 0.2 to 2 mm in diameter at a velocity of 5 to 12 m³/hr per square meter of the column section while causing a gas containing 20 to 30% of carbon dioxide to ascend in countercurrent relation to the spray at a superficial velocity in the column of 2 to 2.5 m/sec. The reaction of the first step is controlled based on the pH of the suspension resulting from the reaction. More specifically, the foregoing conditions are so adjusted that the aqueous suspension will have a pH of 12.0 to 10.5 after the reaction. Under the reaction conditions which will result in a pH of above 12.0, the product has a tendency to contain fine crystals of less than 0.1 μm and aggregates of such crystals, whereas if the reaction is allowed to proceed to such an extent that the pH lowers to a level below 10.5, greater variations will result in the size of crystals.

In the second step of the present process, a suspension of calcium hydroxide is further added to the suspension obtained by the first step and containing cubic grown crystals of calcium carbonate, and the mixture is brought into contact in the form of droplets with a gas containing carbon dioxide in the same manner as in the first step to effect further growth of the crystals. The proportions of cubic calcium carbonate crystals and calcium hydroxide in the mixture, i.e. in the combined suspension, the solids concentration of the suspension, the concentration of carbon dioxide in the gas and various reaction conditions are within the same ranges as in the first step. The second step gives cubic crystals of calcium carbonate of uniform size which is at least 0.1 μm. When cubic calcium carbonate crystals of greater size are desired, the contact of a readjusted suspension with carbon dioxide-containing gas may be repeated a required number of times in the same manner as in the second step.

Further accoding to this invention, a small amount of an alkali metal bicarbonate such as sodium bicarbonate or potassium bicarbonate may be added to the suspension in the first or second step or the suspensions in the first and the second steps, whereby the growth of cubic calcium carbonate crystals can be promoted. The use of bicarbonate is especially effective when an increased amount of calcium hydroxide is used to form larger crystals. The cubic calcium carbonate crystals then obtained, although larger, are very uniform in size and include a reduced amount of aggregates. The amount of alkali metal bicarbonate to be used may be varied in accordance with the size of crystals desired. For example, the amount thereof per 100 parts of the calcium carbonate in the suspension is up to 1 part when it is desired to form grown cubic calcium carbonate crystals in sizes of 0.1 to 0.5 μm, and about 1 to about 3 parts for grown crystal sizes of 0.5 to 1.0 μm. Use of an excess of the bicarbonate more than 5 parts per 100 parts of the calcium carbonate will not produce a noticeably improved result and is not advantageous economically.

The process of this invention will be described below with reference to the accompanying drawing, in which FIG. 1 is a flow chart illustrating a 4-step process embodying the present invention.

A starting aqueous suspension containing calcium hydroxide and cubic crystals of calcium carbonate less than 0.1 μm in average size is led from a container 2 through a line 4 to a first reactor 6 into which the suspension is sprayed. A carbon dioxide-containing gas is sent out from a gas source 8 and upwardly introduced into the first reactor 6 through lines 10 and 12. First-step carbonation occurs in the reactor 6 for the growth of cubic calcium carbonate. The aqueous suspension flowing out from the first reactor 6 via a line 14 is mixed with a suspension of calcium hydroxide sent out from a container 18 by way of a line 20 and a line 22, and the mixture is sprayed into a second reactor 24. The carbon dioxide-containing gas run off from the first reactor 6 through a line 16 is charged into the second reactor 24 upwardly thereof along with the fresh gas containing carbon dioxide sent out from the gas source 8 via lines 10 and 26. Thus, second-step carbonation occurs in the second reactor 24. Similarly, the suspension from lines 28 and 30 reacts with the gas from lines 34 and 36 in a third reactor 32. Furthermore the suspension from lines 38 and 40 reacts with the gas from lines 44 and 46 in a fourth reactor 42, from which the suspension is led into a container 50. Subsequently, the desired product of cubic calcium carbonate crystals is separated from the suspension by a known solid-liquid separator (not shown). The exhaust gas from the fourth reactor 42 is released from a line 52 into the atmosphere as it is or after being cooled and freed from solids.

The embodiment shown in FIG. 1 involves a 4-step reaction, which however is not critical. As already stated, the reaction of this invention has only to be effected in at least two steps. Accordingly, the reaction can be carried out for example in five or more steps. Further insofar as the exhaust gas from one step has a carbon dioxide concentration which is not lower than is specified, it is not always needed to add a fresh carbon dioxide-containing gas to the exhaust gas for use in the following step.

According to the process of this invention, growth of calcium carbonate crystals takes place on the initial fine cubic calcium carbonate crystals less than 0.1 $\mu$m in size and serving as nuclei, forming calcium carbonate crystals of uniform size in the range of 0.1 to 1.0 $\mu$m, having a substantially cubic shape and almost free of aggregates. The product of this invention therefore exhibits outstanding dispersibility and mechanical and optical properties as a filler, extender, additive, basic component or the like for use in rubbers, synthetic resins, coating compositions, inks, papers, cosmetics, etc. For example, the product of this invention, when composed of crystals 0.1 to 0.5 $\mu$m in size, shows high mechanical properties as a filler for synthetic resins of which good dispersibility is required and also exhibits satisfactory dispersibility for use in coating compositions and as a pigment for coating papers, giving excellent gloss and hiding power. When in the range of 0.5 to 1.0 $\mu$m in the size of crystals, the present product can be used in large quantities in synthetic resins, giving good mechanical properties and high hiding power, since it has a relatively low ability to absorb oil but high dispersibility despite its increased size.

Additionally, the cubic calcium carbonate crystals of this invention which are 0.1 to 1.0 $\mu$m in size can be rendered more suitable for various applications when surface-modified with an organic or inorganic material.

For a better understanding of this invention, Examples, Comparison Examples and Reference Examples are given below.

EXAMPLE 1

An aqueous suspension of fine cubic calcium carbonate crystals having an average size of 0.08 $\mu$m and adjusted to a concentration of 10% and to a temperature of 30° C. is fed to a pipeline mixer at a rate of 2000 kg/hr. A milk of lime adjusted to a concentration of 7.4% and to a temperature of 30° C. is also fed to the mixer at a rate of 400 kg/hr. to mix the milk with the suspension. The resulting suspension has a pH of about 12.8. At a rate of 2400 kg/hr., the suspension is sprayed into a reaction column from its top in the form of droplets 1 mm in diameter while a carbon dioxide-containing gas having a concentration of 30% and a temperature of 30° C. is being blown upward through the column at a superficial velocity in the column of 0.7 m/sec., to effect carbonation so that the suspension has a pH of 11.5 to 12.0 after the reaction. The same milk of lime as used in the first-step reaction is admixed at a rate of 400 kg/hr. with the suspension resulting from the reaction, and the mixture is subjected to carbonation under the same reaction conditions as in the first reaction. The same procedure as the second-step reaction is repeated three times. The carbonation is terminated on completion of the fifth step, whereby cubic calcium carbonate crystals are obtained at a rate of about 400 kg/hr. calculated as solids. The crystals have an average size of 0.15 $\mu$m as calculated from the specific surface area determined by the BET method. An electron micrograph of the cubic calcium carbonate crystals reveals that the crystals are very uniform and in the range of about 0.10 to about 0.25 $\mu$m in size.

COMPARISON EXAMPLE 1

An aqueous suspension of fine cubic calcium carbonate crystals having an average size of 0.08 $\mu$m and adjusted to a concentration of 10% and to a temperature of 30° C. is fed to a pipeline mixer at a rate of 2000 kg/hr. A milk of lime adjusted to a concentration of 7.4% and to a temperature of 30° C. is also fed to the mixer at a rate of 1000 kg/hr. to mix the milk with the suspension. At a rate of 3000 kg/hr., the starting suspension is sprayed into a reaction column from its top in the form of droplets 1 mm in diameter while a carbon dioxide-countaining gas having a concentration of 30% and a temperature of 30° C. is being blown upward through the column at a superficial velocity in the column of 0.7 m/sec., to effect carbonation. The same milk of lime as used in the first-step reaction is admixed at a rate of 1000 kg/hr. with the suspension resulting from the reaction, and the mixture is reacted under the same conditions as in the first-step reaction to complete the carbonation.

The calcium carbonate crystals obtained have very widely varying sizes of from 0.06 to 1.5 $\mu$m, although the average size is about 0.15 $\mu$m. Observation under an electron microscope reveals that the calcium carbonate obtained is a mixture of cubic crystals and spindle-shaped aggregates of such cubic crystals. This is attributable to the use of considerably large quantities of calcium hydroxide in the first-step reaction and second-step reaction.

EXAMPLE 2

An aqueous suspension of fine cubic calcium carbonate crystals having an average size of 0.08 $\mu$m and adjusted to a concentration of 5% and to a temperature of 50° C. is fed to a pipeline mixer at a rate of 2000 kg/hr. A milk of lime containing sodium bicarbonate added thereto at a rate of 37 g/hr. and thereafer adjusted to a concentration of 3.7% of calcium hydroxide and to a temperature of 50° C. is also fed to the mixer at a rate of 400 kg/hr. At a rate of 2400 kg/hr., the starting suspension (pH: about 12.8) is continuously sprayed into a reaction column from its top in the form of droplets 1 mm in diameter while a carbon dioxide-containing gas having a concentration of 20% and a temperature of 25° C. is being blown upward through the column at a superficial velocity in the column of 0.5 m/sec. to carbonate the suspension to a pH of 11.0 to 11.5. The same milk of lime (also containing 37 g/hr. of sodium bicarbonate) as used in the first-step reaction is admixed at a rate of 400 kg/hr. with the reaction product, and the mixture is subjected to a second-step carbonation under the same conditions as in the first-step reaction. The same procedure as the second-step reaction is repeated 18 times. The carbonation is terminated on completion of the 20th step, whereby cubic calcium carbonate crystals are obtained at a rate of about 500 kg/hr. calculated as solids. The crystals are very uniform and have an average size of of 0.5 μm as determined by the BET method.

REFERENCE EXAMPLE 1

The cubic crystals of calcium carbonate (100 parts) obtained in Example 1 and having an average size of 0.15 μm, 10 parts of starch oxide and 10 parts of latex are uniformly kneaded to prepare a composition for coating paper. The composition is applied by an applicator bar to one surface of a coating rawstock at a rate of 20 g/m². The wet coated paper is dried in air, then stabilized at 20° C. and 60% RH for 24 hours and thereafter treated by a super calender. The coated paper is tested for properties with the results listed in Table 1 below, which also shows the results obtained with use of commercial precipitated calcium carbonate prepared. (The commercial carbonate is light calcium carbonate composed of non-uniform crystals which, although 0.15 μm in average size as determined by the BET method, have very widely varying sizes and include cubic crystals and spindle-shaped aggregates in mixture.)

Table 1

|  | Product of the invention (Example 1) | Commercial calcium carbonate |
|---|---|---|
| Brightness (%) | 92 | 87 |
| Specular gloss at 75° (%) | 68 | 35 |
| R-I printed gloss at 75° (%) | 82 | 42 |
| Opacity (%) | 95 | 93 |

The results indicate that the calcium carbonate prepared by the process of this invention greatly improves the gloss of coated paper as compared with the commercial calcium carbonate.

REFERENCE EXAMPLE 2

According to the formulation given below, the calcium carbonate (average crystal size: 0.15 μm) obtained in Example 1 is added to 25 wt % xylene solution of short oil alkyd resin (Trade Mark "Phtalkyd 235," product of Hitachi Chemical Co., Ltd.) so that the pigment volume concentration is 61.9%, and glass beads are further added to the resin. Two portions of the mixture are kneaded by a paint shaker for 10 minutes and for 60 minutes respectively to prepare a mill base. The fineness of grind of the mill base is measured in accordance with JIS K 5400 4.4. The coating composition prepared by kneading for 60 minutes in a paint shaker is tested for hiding power by coating a test paper sheet to a thickness of 3 mils with the composition, drying the coating and measuring the reflectance of the coating on black and white paper sheets in accordance with JIS K 5400 6.3. The results are listed in Table 2, which also shows the results obtained with use of the same commercial calcium carbonate as in Reference Example 1.

Table 2

| Formulation of mill base | | |
|---|---|---|
| Pigment | 40 parts | |
| Phtalkyd 235 | 47 | |
| Glass beads | 110 | |
| (1.0–1.5 mm in diameter) | | |

|  | Example 1 | Commercial calcium carbonate |
|---|---|---|
| Fineness of grind (μm) | | |
| Composition kneaded for 10 minutes | 20 | 55 |
| Composition kneaded for 60 minutes | 8 | 22 |
| Hiding power (%) | | |
| Composition kneaded for 60 minutes | 85.5 | 64.8 |

The test results shown that the calcium carbonate of Example 1 prepared by the present process greatly improves the hiding power of coating composition as compared with the commercial calcium carbonate.

EXAMPLE 3

An aqueous suspension of fine cubic calcium carbonate crystals having an average size of 0.08 μm and adjusted to a concentration of 5.0% and to a temperature of 50° C. is fed to a pipeline mixer at a rate of 2000 kg/hr. A milk of lime adjusted to a concentration of 3.7% and to a temperature of 50° C. is also fed to the mixer at a rate of 500 kg/hr. to mix the milk with the suspension. At a rate of 2500 kg/hr., the starting suspension is sprayed into a reaction column from its top in the form of droplets 1 mm in diameter while a carbon dioxide-containing gas having a concentration of 25% and a temperature of 20° C. is flowing upward through the column at a superficial velocity in the column of 0.7 m/sec., to effect carbonation to such an extent that the suspension has a pH of 10.5 to 11.0 after the reaction. This reaction grows the fine crystals to an average size of 0.10 μm. The same milk of lime as used in the first-step reaction is admixed at a rate of 500 kg/hr. with the suspension resulting from the reaction, and the mixture is subjected to carbonation under the same conditions as above to obtain grown crystals having an average sizes of 0.11 μm. The same procedure as the second-step reaction is repeated 6 times, whereupon the carbonation is completed. The average size increases by 0.01 to 0.02 μm every time the procedure is repeated. Consequently, cubic crystals of calcium carbonate are obtained at a rate of 300 kg/hr. calculated as solids. The crystals have an average size of 0.25 μm as calculated from the specific surface area of the crystals.

COMPARISON EXAMPLE 2

Calcium carbonate is prepared in the same manner as in Example 1 except that the suspension sprayed in the first-step reaction contains 20% of fine crystals of calcium carbonate and 14.8% of calcium hydroxide and that the concentration of milk of lime added in the second-step reaction and in the following reaction steps is 14.8%. The calcium carbonate formed is a mixture of cubic crystals and spindle-shaped crystals, the crystals having widely varying sizes in the range of 0.1 to 1.5 μm although 1.2 μm in average size.

EXAMPLE 4

Various runs of calcium carbonate are prepared in the same manner as in Example 1 except that the suspension is used in droplets of varying diameters. Table 3 shows the reaction rate and yield of each product obtained.

COMPARISON EXAMPLE 3

Calcium carbonate is prepared in the same manner as in Example 1 except that the suspension is used in droplets having a diameter of 0.1 or 2.5 mm which is outside the range of 0.2 to 2mm. Table 3 also shows the reaction rate and yield of the products.

Table 3

| | Diameter of droplets (mm) | Product | |
|---|---|---|---|
| | | Yield (%) 1) | Reaction Rate (%) |
| Comp. Ex. 3 | 0.1 | 71 | 100 |
| Example 4 | 0.2 | 95 | 100 |
| " | 1.0 | 99 | 100 |
| " | 2.0 | 99 | 100 |
| Comp. Ex. 3 | 2.5 | 99 | 80 |

Note:
1) The amount of product theoretically obtainable from the initial cubic calcium carbonate crystals serving as nuclei is assumed to be 100%.

What we claim is:

1. A process for preparing cubic calcium carbonate crystals of uniform size in the range of about 0.1 to about 1.0 microns which comprises:
   (i) a first step of spraying a starting aqueous suspension containing calcium hydroxide and cubic calcium carbonate crystals less than 0.1 microns in average size into a carbon dioxide-containing gas ascending at a superficial velocity of about 0.1 to 3.0 m/sec in the form of droplets 0.2 to 2.0 microns in diameter, the suspension having a solids concentration of up to 15% by weight and the ratio of calcium carbonate to calcium hydroxide in the suspension being 100:1 to 30 by weight, and
   (ii) a second step of adding calcium hydroxide to the aqueous suspension resulting from the first step and spraying the mixture into a carbon dioxide-containing gas ascending at a superficial velocity of about 0.1 to 3.0 m/sec in the form of droplets 0.2 to 2.0 microns in diameter, the mixture having a solids concentration of up to 15% by weight and the ratio of calcium carbonate to calcium hydroxide in the mixture being 100:1 to 30 by weight.

2. A process as defined in claim 1 which further comprises an additional step of adding calcium hydroxide to the aqueous suspension resulting from the preceding step and spraying the mixture into a carbon dioxide-containing gas in the form of droplets 0.2 to 2.0 microns in diameter, the additional step being conducted at least once.

3. A processs as defined in claim 1 wherein the ratio of the calcium carbonate to the calcium hydroxide in the first step is 100:10-25 by weight.

4. A process as defined in claim 3 wherein the ratio of the calcium carbonate to the calcium hydroxide is 100:15-20 by weight.

5. A process as defined in claim 1 wherein the solids concentration in the first step is 5-10%.

6. A process as defined in claim 1 wherein the ratio of the calcium carbonate to the calcium hydroxide in the second step is 100:10-25 by weight.

7. A process as defined in claim 6 wherein the ratio of the calcium carbonate to the calcium hydroxide is 100:15-20 by weight.

8. A process as defined in claim 1 wherein the solids concentration in the second step is 5-10%.

9. A process as defined in claim 1 wherein the mixture in the second step further contains a bicarbonate of alkali metal.

10. A process as defined in claim 9 wherein the alkali metal bicarbonate is contained in an amount of up to 5 parts by weight per 100 parts by weight of the calcium carbonate in the mixture.

11. A process as defined in claim 1 wherein the gas has a carbon dioxide concentration of at least 20%.

12. A process as defined in claim 1 wherein the reaction temperature is up to 70° C.

13. A process as defined in claim 12 wherein the reaction temperature is 40-60° C.

14. A process as defined in claim 1 wherein the starting aqueous suspension containing calcium hydroxide and calcium carbonate further contains a bicarbonate of alkali metal.

15. A process as defined in claim 14 wherein the alkali metal bicarbonate is contained in an amount of up to 5 parts by weight per 100 parts by weight of the calcium carbonate in the starting suspension.

* * * * *